United States Patent [19]

Toms, Jr.

[11] Patent Number: 4,666,215

[45] Date of Patent: May 19, 1987

[54] WHEEL ASSEMBLY AND METHOD AND APPARATUS FOR MAKING SAME

[75] Inventor: Robert S. Toms, Jr., Warrenville, Ill.

[73] Assignee: Miner Enterprises, Inc., Geneva, Ill.

[21] Appl. No.: 809,271

[22] Filed: Dec. 16, 1985

[51] Int. Cl.$^4$ ............................ B60B 5/02; B60C 1/00

[52] U.S. Cl. ................................. 301/5.7; 301/63 PW; 29/235; 29/450

[58] Field of Search ................ 29/130, 159 R, 159.1, 29/235, 450; 301/5.3, 5.7, 63 PW; 152/7

[56] References Cited

U.S. PATENT DOCUMENTS

| | | | |
|---|---|---|---|
| 2,047,976 | 7/1936 | Lord | 29/450 |
| 2,100,542 | 11/1937 | Grange et al. | 301/5.3 |
| 3,073,016 | 1/1963 | Drake | 29/450 |
| 4,198,037 | 5/1980 | Anderson | 267/153 |
| 4,535,827 | 8/1985 | Seaford | 301/63 PW |
| 4,566,678 | 1/1986 | Anderson | 301/63 PW X |

*Primary Examiner*—David A. Scherbel

*Attorney, Agent, or Firm*—Wood, Dalton, Phillips, Mason & Rowe

[57] ABSTRACT

A wheel assembly, and a method and apparatus for fabricating the same, are disclosed. The wheel assembly includes an annular bearing hub and an annular tread layer of thermoplastic elastomeric material, such as a copolyester polymer elastomer material, about the bearing hub. The tread layer has an initial free radial thickness. The material is such that upon being radially compressed at least thirty percent of its initial radial thickness the material will retain a substantial portion of the thickness reduction after being compressed. The method and apparatus include applying a radial force by means of a cone-shaped wedge member from within the tread layer while the outer periphery of the tread layer is radially contained, the radially applied force being sufficient to compress the tread layer at least thirty percent of its initial radial thickness. The bearing hub is moved axially into the compressed annular tread layer immediately behind the cone-shaped wedge member.

24 Claims, 5 Drawing Figures

U.S. Patent  May 19, 1987  4,666,215
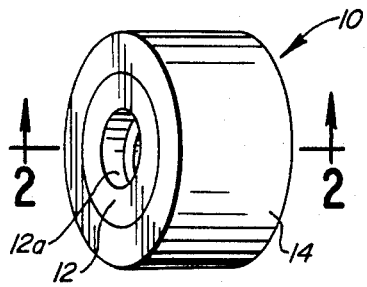
FIG. 1
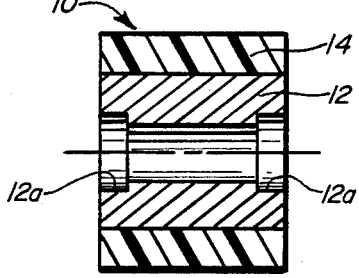
FIG. 2
FIG. 3
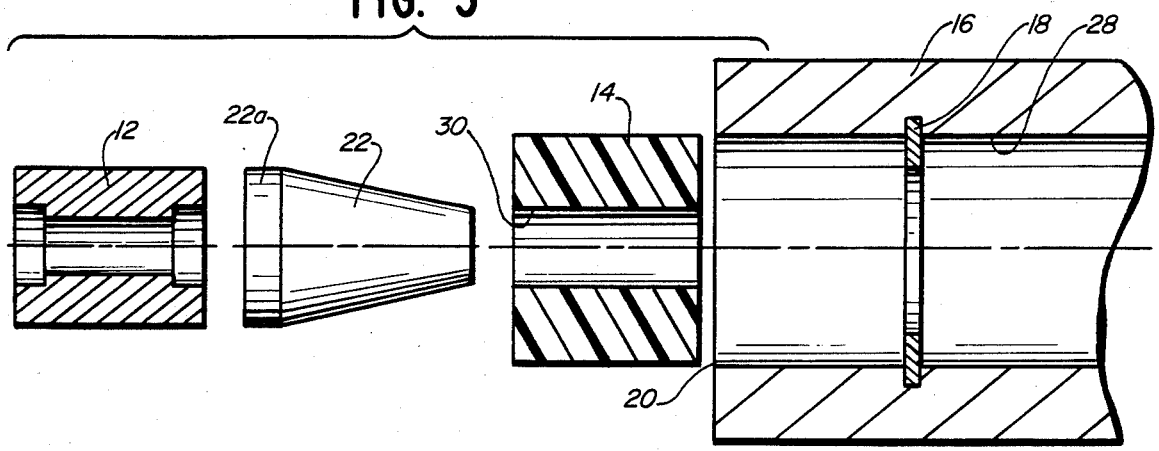
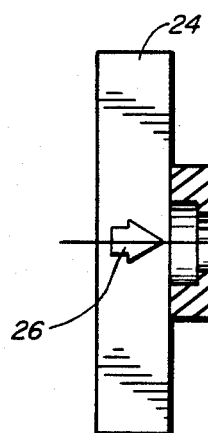
FIG. 4
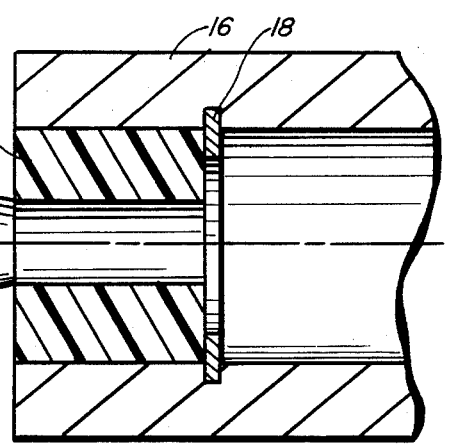
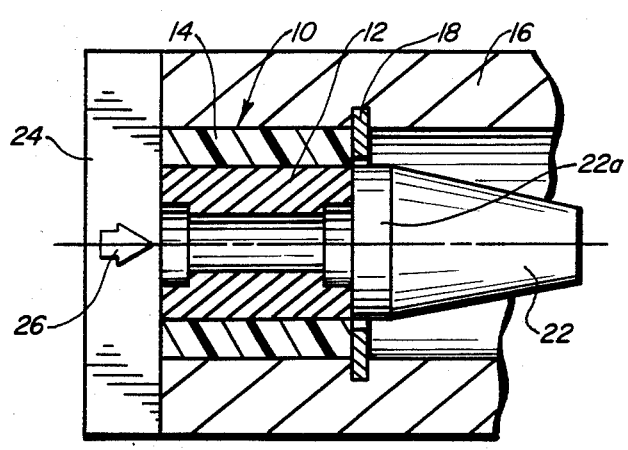
FIG. 5

WHEEL ASSEMBLY AND METHOD AND APPARATUS FOR MAKING SAME

FIELD OF THE INVENTION

This invention generally relates to rolling elements and, particularly, to a non-inflatable wheel assembly.

BACKGROUND OF THE INVENTION

Non-inflatable roller elements or wheel assemblies conventionally are fabricated with some sort of bearing hub about which is positioned and/or bonded a tread layer of more resilient material than the bearing hub. Examples of various applications for such wheel assemblies include high performance tires for fork trucks, dollies, street sweepers and other heavy load tires, as well as drum and cylinder rollers, conveyor rollers or the like. Such wheel assemblies must withstand a wide variety of loads, temperatures, chemicals and surface conditions.

Heretofore, the most common wheel assemblies for such usages have been made with a tread layer of rubber or polyurethane. Unfortunately, such materials do not provide sufficient resistance to abrasion, cuts and/or cut propagation. Such materials also have high failure rates due to hysteretic heating which softens the material, releases the bond between the material and the bearing hub, and simply breaks down the material. Such materials also lack sufficient contact and impact load capacity. In fact, when using fork lift trucks in high activity installations, where the wheel or tire tread layer is fabricated of polyurethane material, the wheel assemblies may have to be replaced as often as every other day.

This invention is directed to solving these problems by providing a remarkably new and improved non-inflatable wheel assembly which has greater material memory, very low hysteretic heating, very high contact and impact load capacity and has excellent resistance to abrasion and/or cut propagation. These advantages are provided by a new and improved composition of the tread layer, as well as a method and apparatus for manufacturing a wheel assembly incorporating the new composition tread layer.

More particularly, copolyester polymer elastomer material was discovered and disclosed in U.S. Pat. No. 4,198,037 to Anderson, dated Apr. 15, 1980 and assigned to the assignee of this invention, for use as a novel elastomeric spring. As disclosed therein, one such polymer, sold under the trademark HYTREL, is made from three basic ingredients, namely, (1) dimethyl terephthalate, (2) polyglycols such as polytetramethylene ether glycol, polyethylene ether glycol or polypropylene ether glycol, and (3) short chain diols like butanediol and ethylene glycol.

Such copolyester polymers act suitably when employed as tension springs. However, they have proven to be quite unsuitable for use as a compressive spring material. This is due to the fact that when compressed over about ten percent they commence taking on a permanent set. Obviously, a resilient material that permanently deforms under load is quite unsuitable for the intended purposes.

However, the patent described above discloses a method by which a thermoplastic elastomeric material, such as the copolyester polymer elastomer material, can be treated for rendering the material usable as a resilient material, particularly a compression spring. Generally, that treatment, to convert the elastomer into a resilient or compression spring material, comprises the application of a compressive force to a body or thickness of the material which compresses the body or thickness to an extent equal to at least thirty percent of its previous free thickness, measured in the direction of the applied pressure.

This invention incorporates such material in a new and improved wheel assembly by a novel method and apparatus to produce a rolling element or tire having remarkable properties not heretofore available.

SUMMARY OF THE INVENTION

An object, therefore, of the invention is to provide a new and improved rolling element or tire, hereinafter generally referred to as a wheel assembly, of the character described.

In the exemplary embodiment of the invention, the wheel assembly and method of making the same contemplate providing an annular bearing hub, with an annular tread layer of thermoplastic elastomeric material about the bearing hub. The tread layer has a given initial free radial thickness, preferably of generally uniform thickness. The material, such as a copolyester polymer elastomer material, is such that upon being radially compressed at least thirty percent of the initial radial thickness, the material will retain a substantial portion of the thickness reduction after being compressed.

The method contemplates applying a radial force sufficient to compress the tread layer at least thirty percent, or in a range of about thirty to seventy percent, of its intial free radial thickness. The compressed tread layer is positioned about the bearing hub to form a new and improved wheel assembly.

The method and apparatus contemplate confining the tread layer, in its initial free state, within containment means, such as a tubular member. The compressing force then is applied from within the annular tread layer. As disclosed herein, such radial expansion is carried out by a cone-shaped wedge member movable axially into the tread layer while the outer periphery of the tread layer is contained. Means also are provided for moving the bearing hub axially into the annular tread layer immediately behind the cone-shaped wedge member whereby the compressed tread layer expands slightly to grip the bearing hub. All of these fabrication functions, thereby, are carried out in a single axial stroke of the apparatus.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of a wheel assembly fabricated according to the invention;

FIG. 2 is a central, axial section taken generally along line 2—2 of FIG. 1;

FIG. 3 is an exploded, axial section through the elements of the wheel assembly, in conjunction with certain components of the apparatus for radially compressing the tread layer;

FIG. 4 is a view similar to that of FIG. 3, but illustrating the compressing cone about to be moved axially into the tread layer; and FIG. 5 is a view similar to that of FIG. 4, but with the apparatus having compressed the tread layer and fully inserted the bearing hub.

DETAILED DESCRIPTION OF THE PREFERRED EMBODIMENT

Referring to the drawings in greater detail, and first to FIGS. 1 and 2, a wheel assembly fabricated according to the concepts of this invention is generally designated 10. The wheel assembly includes an annular bearing hub 12 having end bearing races 12a. An annular tread layer 14 is positioned about bearing hub 12. Preferably, the outer surface of bearing hub 12 is cylindrical, and tread layer 14 is of generally uniform thickness axially of the wheel assembly.

Tread layer 14 is fabricated of a thermoplastic elastomeric material. This material is of the type sold by E. I. DuPont de Nemours & Co. of Wilmington, Del., under the trademark HYTREL. As explained above, this material comprises a copolyester polymer elastomer. The material is such that upon being compressed at least thirty percent of an initial free thickness, the material will retain a substantial portion of the thickness reduction after being compressed. This compression converts the material from one having inherent physical properties that make it unsuitable for use as a resilient material, such as a compression spring, to a permanently compressed body which is rendered usable as a compression spring or other application requiring a degree of resiliency, as disclosed herein.

Referring to FIG. 3, tread layer 14 is shown in its "free" state. In other words, the tread layer has an initial free radial thickness before the material is compressed to permanently retain its reduced thickness.

FIGS. 3-5 illustrate sequential steps in fabricating wheel assembly 10 in accordance with the method and apparatus of the invention. More particularly, the condition of tread layer 14 in its "free" state in FIGS. 3 and 4, and in its permanently compressed state in FIG. 5 should be noted. The positioning of bearing hub 12 in the three figures also should be noted.

The apparatus for carrying out the fabrication method of the invention generally includes radial containment means in the form of a tubular or cylindrical member 16. Containment tube 16 can be fabricated of a heavy wall steel construction. The containment tube is provided for confining radial expansion of tread layer 14. An abutment stop in the form of a ring 18 is provided within containment tube 16, a distance inwardly from an entrance opening 20 of the containment tube substantially equal to the length of tread layer 14.

Radial expansion means in the form of a frustoconical member 22 is provided for applying a radially outward force from within tread layer 14 sufficient to compress the tread layer at least 30 percent of its initial free radial thickness, while the tread layer is confined by containment tube 16. A loading plate 24 is provided for applying an axial load in the direction of arrows 26 (FIGS. 4 and 5). It should be understood that loading plate 24 is simply shown somewhat schematic and represents a component of a press machine.

In fabricating wheel assembly 10 utilizing the apparatus described above, tread layer 14 first is aligned with cylindrical bore 28 on the inside of containment tube 16, as illustrated in FIG. 3. Of course, the diameter of bore 28 should be the same as the outside diameter of tread layer 14, or very slightly less to allow the tread layer to slide into containment tube 16 into abutment with stop 18. Expansion cone 22 then is positioned for insertion into an axial bore 30 formed in tread layer 14 in its free state as shown in FIGS. 3 and 4. The smaller end of the expansion cone may be dimensioned slightly smaller than bore 30 to provide a pilot means for inserting the expansion cone into the tread layer.

Bearing hub 12 is positioned on the outside, or against the large end, of expansion cone 22, and loading plate 24 is positioned against the opposite end of the bearing hub as illustrated in FIG. 2. As shown, tread layer 14 still is in its initial free state, and bearing hub 12 is sandwiched between expansion cone 22 and loading plate 24. Although not shown in the drawings, for piloting purposes, the enlarged end of expansion cone 22 and the inner side face of loading plate 24 could be provided with bosses complementary in shape with bearing races 12a of bearing hub 12 so that tread layer 14, expansion cone 22, bearing hub 12 and loading plate 24 all are positioned in axial coalignment as shown in FIG. 4.

A force then is applied in the direction of arrows 26 by an appropriate press machine. In a single stroke, expansion cone 22 will move into and through tread layer 14 while, at the same time, bearing hub 12 will be forced immediately behind the expansion cone into a position as shown in FIG. 5, properly positioned within tread layer 14 to form the finished wheel assembly 10. It can be seen that the outer or trailing end of expansion cone 22 has an annular, flat land 22a of a diameter complementary to the outside diameter of bearing hub 12.

It also is contemplated that a tread pattern could be provided about the surface of internal cylindrical bore 28 of containment tube 16 for forming a tread about the outside of tread layer 14. This would be appropriate for vehicular tires, for instance with fork lift trucks or the like.

From the foregoing it will be understood that expansion cone 22 converts axial force into a radial expansion force which is effective to compress tread layer 14. The diameter of land 22a of expansion cone 22 should be such that the tread layer is compressed in a range of about 30-70% of its initial free radial thickness (i.e. the free state shown in FIGS. 3 and 4). Since the tread layer is fabricated of thermoplastic elastomeric material, such as copolyester polymer elastomer material, the material will retain a substantial portion of the thickness reduction after being removed from containment tube 16. A very slight expansion is experienced when the compressive forces are removed from such material, and this slight expansion is effective to provide a tight press-fit of tread layer 14 onto bearing hub 12. Of course, if an additional bonding medium is desired, that medium could be applied to the outside cylindrical surface of bearing hub 12 prior to its being moved axially into the compressed tread layer. In addition, although a substantial force is used to compress the tread layer, abutment stop 18 need not be of substantial construction since, from the moment of initial radial expansion, considerable friction is created between the outside diameter of tread layer 14 and the inside surface of bore 28 through containment tube 16.

An actual wheel assembly fabricated according to the invention described above has proven to possess greater material memory, lower hysteretic heating, higher contact and impact load capacity and more resistance to abrasion and/or cut propagation than wheel assemblies, rolling elements or tires heretofore produced with such materials as polyurethane or the like. A wheel was fabricated with a material having a 55 durometer on the "D" scale, which was selected for its stiffness and durability when used as a rolling tire for a fork lift truck, for instance. Of course, other durometer material can be used, depending on the requirements. Although the tread layer will retain a substantial portion of the thickness reduction after being compressed within a range of 30–70%, very effective wheel assemblies have been produced with a compression on the order of 40–45%. Such material could even be compressed in the range of 90–95%. However, this is not generally very practical because of the exhorbitant amount of compressive forces required. By compressing the tread layer by 30–70%, the result is a permanent material set in the tread layer of the wheel assembly and provides for greater material properties than any wheel assembly heretofore available.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A wheel assembly, comprising:
bearing hub means; and
an annular tread layer of thermoplastic elastomeric material about the bearing hub means, the tread layer having an initial free radial thickness, said material being such that upon being radially compressed at least thirty percent of said initial radial thickness the material will retain a substantial portion of the thickness reduction after being compressed, defined by radially compressing the tread layer in one radial direction while containing the tread layer in an opposing radial direction by an extent equal to at least thirty percent of the initial radial thickness.

2. The wheel assembly of claim 1 wherein said material is a copolyester polymer elastomer material.

3. The wheel assembly of claims 1 or 2 wherein said material has a durometer hardness of approximately 55 on the D scale.

4. The wheel assembly of claims 1 or 2 wherein said bearing hub means is annular and said tread layer is of generally uniform thickness.

5. The wheel assembly of claim 1 wherein said tread layer has a tread pattern about the periphery thereof.

6. A method of making a wheel assembly, comprising the steps of:
providing bearing hub means;
providing an annular tread layer of thermoplastic elastomeric material, the tread layer having an initial free radial thickness,
said material being such that upon being radially compressed at least thirty percent of said initial radial thickness the material will retain a substantial portion of the thickness reduction after being compressed;
applying a radial force to the tread layer in one radial direction while containing the tread layer in an opposing radial direction, said radial force being sufficient to compress the tread layer at least thirty percent of its initial radial thickness; and
positioning the tread layer about the bearing hub means.

7. The method of claim 6 wherein said material is provided of copolyester polymer elastomer material.

8. The method of claim 6 wherein said radial force is sufficient to compress the tread layer in a range of about 30–70% of its initial free radial thickness.

9. The method of claim 6 wherein said bearing hub means is annular and the tread layer is provided of a generally uniform thickness.

10. The method of claim 6, including providing a tread pattern about the periphery of the tread layer.

11. A method of making a wheel assembly, comprising the steps of:
providing bearing hub means;
providing an annular tread layer of thermoplastic elastomeric material, the tread layer having an initial free radial thickness,
said material being such that upon being radially compressed at least thirty percent of said initial radial thickness the material will retain a substantial portion of the thickness reduction after being compressed;
applying a radial force from within the annular tread layer sufficient to compress the tread layer at least 30% of its initial radial thickness while the outer periphery of the tread layer is radially contained; and
positioning the tread layer about the bearing hub means.

12. The method of claims 6 or 11 wherein the bearing hub means is positioned within the annular tread layer after the tread layer is radially compressed.

13. The method of claim 11, including an apparatus for carrying out the method, the apparatus comprising a cone shaped wedge member axially insertable into the annular tread layer while the tread layer is radially contained.

14. The method of claim 13 wherein said apparatus includes a containment tube positioned about the outer periphery of the tread layer.

15. The method of claims 13 or 14 wherein said apparatus includes means for moving the bearing hub means axially into the annular tread layer immediately behind the cone shaped wedge member.

16. A method of making a wheel assembly, comprising the steps of:
providing an annular tread layer of generally uniform thickness and of thermoplastic elastomeric material, the tread layer having an initial free radial thickness,
said material being such that upon being radially compressed at least thirty percent of said initial radial thickness the material will retain a substantial portion of the thickness reduction after being compressed;
applying a radial force from within the annular tread layer while the outer periphery of the tread layer is radially contained, the radial force being sufficient to compress the tread layer in a range of about 30–70% of its initial free radial thickness; and
positioning an annular bearing hub means within the annular tread layer.

17. The method of claim 16 wherein said material is provided of copolyester polymer elastomer material.

18. The method of claim 16, including providing a tread pattern about the periphery of the tread layer.

19. The method of claim 16 wherein the bearing hub means is positioned within the annular tread layer after the tread layer is radially compressed.

20. An apparatus for fabricating a wheel assembly which includes bearing hub means and an annular tread layer of thermoplastic elastomeric material about the bearing hub means, the tread layer having an initial free radial thickness and the material being such that upon being radially compressed at least thirty percent of said initial radial thickness the material will retain a substantial portion of the thickness reduction after being compressed, the apparatus comprising:

radial containment means for positioning about the outer periphery of the tread layer; and radial expansion means for applying a radially outward force from within the tread layer sufficient to compress the tread layer at least thirty percent of its initial radial thickness.

21. The apparatus of claim 20 wherein said radial expansion means comprises a cone-shaped wedge member movable axially into the tread layer.

22. The apparatus of claim 21, including means for moving the bearing hub means axially into the annular tread layer immediately behind the cone-shaped wedge member.

23. The apparatus of claims 20 or 21 wherein said containment means comprises a tube-shaped member.

24. The apparatus of claim 20, including means for positioning the bearing hub means into the tread layer after the layer is compressed.

* * * * *